United States Patent [19]
Ota

[11] Patent Number: 5,541,692
[45] Date of Patent: Jul. 30, 1996

[54] CAMERA WITH TRIPLET LENSES

[75] Inventor: Kohei Ota, Tokyo, Japan

[73] Assignee: Konica Corporation, Hachioji, Japan

[21] Appl. No.: 492,133

[22] Filed: Jun. 19, 1995

[30] Foreign Application Priority Data

Jun. 24, 1994 [JP] Japan .................................. 6-143362
Mar. 16, 1995 [JP] Japan .................................. 7-083439

[51] Int. Cl.$^6$ .................................................. G03B 1/18
[52] U.S. Cl. ...................................... 354/195.12; 354/203
[58] Field of Search .......................... 354/195.1, 195.12, 354/203; 359/645, 784, 785

[56] References Cited

U.S. PATENT DOCUMENTS

| | | | |
|---|---|---|---|
| 3,649,103 | 3/1972 | Kamimura | 359/790 |
| 3,784,287 | 1/1974 | Gray | 359/790 |
| 3,944,337 | 3/1976 | Ruben | 359/716 |
| 4,104,308 | 8/1978 | Owen, Jr. et al. | 359/716 |
| 4,609,271 | 9/1986 | Watanabe | 354/202 |
| 4,620,775 | 11/1986 | Fujioka | 359/739 |
| 4,787,724 | 11/1988 | Kudo et al. | 359/790 |
| 5,161,065 | 11/1992 | Ohshita | 359/739 |

OTHER PUBLICATIONS

Japan Patent Abstracts, JP 113016, Section P, Section No. 923, vol. 13, No. 382, p. 14, Aug. 24, 1989.
Japan Patent Abstracts, JP 7013071, published Jan. 17, 1995.
Japan Patent Abstracts, JP 4097111, Section P, Section No. 1387, vol. 16, No. 327, p. 115, Jul. 16, 1992.

*Primary Examiner*—Michael L. Gellner
*Assistant Examiner*—Eddie C. Lee
*Attorney, Agent, or Firm*—Finnegan, Henderson, Farabow, Garrett & Dunner, L.L.P.

[57] ABSTRACT

A camera provided with a triplet type lens for taking a photograph in which the first lens having a positive refracting power, the second lens having a negative refracting power and the third lens having a positive refracting power are arranged in that order from the photographic object side of the camera, and a diaphragm is located at the rear of the triplet type lens. In this camera, the longitudinal direction of the picture-taking image plane is curved onto the photographic object side, and the triplet type lens satisfy: $0.41 \leq P.D \leq 0.98$ where P is the Petzval's Stun of the triplet type lens and D is the length of the diagonal line of the image plane.

12 Claims, 12 Drawing Sheets

F 5.7

SPHERICAL
ABERRATION $\omega = 37.1°$

ASTIGMATISM $\omega = 37.1°$

DISTORTION

F 6.7

-1.0   1.0
SPHERICAL
ABERRATION

ω = 36.8°

-1.0   1.0
ASTIGMATISM

ω = 36.8°

-10   10 (%)
DISTORTION

SPHERICAL
ABERRATION

ASTIGMATISM

DISTORTION

F 5.7

SPHERICAL ABERRATION $\omega = 37.9°$

ASTIGMATISM $\omega = 37.9°$

DISTORTION

F 5.7

-1.0    1.0
SPHERICAL
ABERRATION

ω = 37.1°

-1.0    1.0
ASTIGMATISM

ω = 37.1°

-10    10 (%)
DISTORTION

F 5.7 d
g

-1.0    1.0
SPHERICAL
ABERRATION

ω = 37.1°

S   M

-1.0    1.0
ASTIGMATISM

ω = 37.1°

-10    10 (%)
DISTORTION

F 6.7

SPHERICAL
ABERRATION

ω = 37.8°

ASTIGMATISM

ω = 37.8°

DISTORTION

F 5.8

SPHERICAL ABERRATION $\omega = 36.1°$

ASTIGMATISM $\omega = 36.1°$

DISTORTION

SPHERICAL ABERRATION

ASTIGMATISM

DISTORTION

SPHERICAL ABERRATION

ASTIGMATISM

DISTORTION

CAMERA WITH TRIPLET LENSES

BACKGROUND OF THE INVENTION

The present invention relates to a lens shutter camera having a small triplet type picture-taking lens.

It is strongly demanded that the picture-taking lens of a lens shutter camera is small and inexpensive. A triplet type picture-taking lens at the rear of which a diaphragm is arranged suitably meets this demand. For example, triplet type picture-taking lenses meeting the demand are disclosed in the examples 1 to 4 of Japanese Patent Publication Open to Public Inspection No. 13071/1995, each example of Japanese Patent Publication Open to Public Inspection No. 97111/1992, and each example of Japanese Patent Publication Open to Public Inspection No. 133016/1989.

On the other hand, a camera system to which a new film standard is applied has been developed recently. For example, on page 11 of the December number of 1994 of "Photographic Industry", there is a description of a new system in which films of 24 mm width are used and 3 types of image planes are provided. Compared with the conventional system in which roll films of 35 mm width are used, the image plane size of the new system is small. Accordingly, a diameter of the permissible circle of confusion is small. Therefore, it is necessary to provide a camera of high image formation performance having a picture-taking lens suitable for this new system.

In order to allow a camera having a triplet type picture-taking lens to be compact, it is necessary to reduce the entire length of the lens including the back focal length with respect to a predetermined image plane size. In order to meet the requirement, there are two methods.

(1) One is to reduce the telephoto ratio.

(2) The other is to reduce the focal distance so that the lens can be of a wide angle.

In any cases, it is difficult to obtain a flat image surface because the curvature of the image surface is deteriorated, Which is peculiar to a triplet lens. That is, a sagittal image surface becomes to be greatly "under" at an intermediate field angle, and it becomes to be greatly "over" at the maximum field angle. Therefore, it is difficult to conduct correction. When the telephoto ratio is reduced, coma is greatly deteriorated, and when the focal distance is reduced so as to make the angle to be wide, the Petzval's Sum is increased, so that it becomes difficult to correct the aberration. When the angle of the lens is made to be wide, not only the aberration is deteriorated but also a ratio of illumination of edge of image field is decreased. Accordingly, in the case of a triplet type lens at the rear of which a diaphragm is arranged, it is not practical that the field angle is set to be not less than 80°.

In the cases of lenses described in the examples 1 to 4 of Japanese Patent Publication Open to Public Inspection No. 13071/1995, each lens is made of glass, and when the entire length of the lens including the back focal length is L, and also when the length of a diagonal line of the image surface is D, the value of L/D is approximately 0.8 which is relatively low, however, it is not sufficient. Further, the cost is higher than that of lens made of synthetic resin.

In the cases of lenses described in each example of Japanese Patent Publication Open to Public Inspection Nos. 97111/1992 and 133016/1989, the lens is composed of two component lenses made of synthetic resin, which is inexpensive, however, the value of L/D is approximately 0.9 to 1.0, which is large. Even if the minimum F-number is set at a large value in a practical range so that an allowable amount of aberration can be increased, it is difficult to reduce the value of L/D to be not more than 0.8 or 0.7.

SUMMARY OF THE INVENTION

An object of the present invention is to provide a camera having a small inexpensive triplet type lens, the image formation performance of which is sufficiently high even when a roll film of 24 mm width is used.

In order to accomplish the above object, the present invention is to provide a camera provided with a triplet type lens for picture-taking in which the first lens having a positive refracting power, the second lens having a negative refracting power and the third lens having a positive refracting power are arranged from the photographic object side in this order, and a diaphragm is located at the rear of the triplet type lens. In this camera, the longitudinal direction of the picture-taking image plane is curved onto the photographic object side, and the triplet type lens satisfies the following inequality.

$$0.41 \leq P.D \leq 0.98 \quad (1)$$

where

P: Petzval's Sum of the triplet type lens

D: Length of the diagonal line of the picture-taking image plane.

It is preferable that the triplet type lens of the camera of the present invention satisfies the following inequality.

$$0.15 \leq -\Delta/(P.(0.35D)^2/2) \leq 1.2 \quad (2)$$

where $\Delta$: Amount of curvature of the picture-taking image plane at a position 0.35D distant from the center of the picture-taking image plane in the longitudinal direction of the picture-taking image plane. In this case, an amount of curvature in the photographic object direction is defined to be negative.

Further, it is preferable that the triplet type lens of the camera of the present invention satisfies, the following inequalities.

$$0.40 \leq f_1/f \leq 1.00 \quad (3)$$

$$0.01 \leq d_4/f \leq 0.06 \quad (4)$$

where f: Focal length of the triplet lens $f_1$: Focal length of the first lens $d_4$: Interval between the second and third lenses on the optical axis Further, it is preferable that the triplet type lens of the camera of the present invention satisfies the following inequalities.

$$0.21 \leq r_1/f \leq 0.38 \quad (5)$$

$$4.0 \leq F \leq 8.0 \quad (6)$$

where $r_1$: Radius of curvature of the first surface of the first lens

F: Minimum F-number

When the width of the film used for the camera of the present invention is 24 mm, it is preferable that the triplet type lens of the camera satisfies the following inequality.

$$0.20 \leq -\Delta \leq 1.20 \qquad (7)$$

When the width of the film is 24 mm and the camera is a fixed focus one having no focus adjusting mechanism, it is preferable that the above triplet type lens satisfied the following inequality.

$$21 \leq f\sqrt{(90 \cdot F_{max})} \qquad (8)$$

where $F_{max}$: Maximum F-number used in this camera

When at least two lenses in the triplet type lens are made of a synthetic resin, it is preferable that the following inequalities are satisfied.

$$0.55 \leq P \cdot D \leq 0.90 \qquad (1')$$
$$0.15 \leq -\Delta/(P \cdot (0.35D)^2/2) \leq 0.80 \qquad (2')$$
$$0.21 \leq r_1/f \leq 0.32 \qquad (5')$$

Further, it is preferable that the following inequalities are satisfied.

$$0.60 \leq P \cdot D \leq 0.80 \qquad (1'')$$
$$0.18 \leq -\Delta/(P \cdot (0.35D)^2/2) \leq 0.60 \qquad (2'')$$
$$0.23 \leq r_1/f \leq 0.28 \qquad (5'')$$

When an especially high image quality is required, it is preferable that the following inequality is satisfied.

$$0.18 \leq -\Delta/(P \cdot (0.35D)^2/2) \leq 0.40 \qquad (2''')$$

When the first lens is made of glass and the second and third lenses are made of a synthetic resin, it is preferable that the following inequality is satisfied.

$$0.50 \leq f_1/f \leq 0.80 \qquad (3')$$

It is more preferable that the following inequalities are satisfied.

$$0.60 \leq f_1/f \leq 0.70 \qquad (3'')$$
$$0.00 \leq n_1 - n_3 \leq 0.21 \qquad (9)$$

where $n_1$: Index of refraction of glass of the first lens
$n_3$: Index of refraction of glass of the third lens When the first and second lenses are made of a synthetic resin and the third lens is made of glass, it is preferable that the following inequality is satisfied.

$$0.60 \leq f_1/f \leq 1.00 \qquad (3''')$$

It is more preferable that the following inequality is satisfied.

$$0.70 \leq f_1/f \leq 0.90 \qquad (3'''')$$

When all of the first, second and third lenses of the triplet lens are made of glass, it is preferable that the following inequalities are satisfied.

$$0.50 \leq P \cdot D \leq 0.80 \qquad (1''')$$
$$0.30 \leq -\Delta/(P \cdot (0.35D)^2/2) \leq 1.10 \qquad (2'''')$$
$$0.28 \leq r_1/f \leq 0.35 \qquad (5''')$$

It is more preferable that the following inequalities are satisfied.

$$0.55 \leq P \cdot D \leq 0.70 \qquad (1'''')$$
$$0.30 \leq -\Delta/(P \cdot (0.35D)^2/2) \leq 0.60 \qquad (2''''')$$
$$0.50 \leq f_1/f \leq 0.70 \qquad (3''''')$$

According to the triplet type lens of the camera of the present invention, it is possible to reduce a value of L/D when an amount of curvature on the Petzval's image surface is allowed to be large. Curvature on the image surface caused when the Petzval's Sum is large is corrected when the longitudinal direction of the picture-taking image plane is curved onto the photographic object side.

An amount of curvature on the Petzval's image surface is determined by the conditional expression (1). The Petzval's Sum P is defined by the following expression.

Expression 1

$$P = \sum_i \left( \frac{1}{N_i} - \frac{1}{N_i'} \right) \frac{1}{r_i}$$

where the radius of curvature on the surface i is ri, and the indexes of refraction before and after the surface i are respectively Ni and Ni'.

An amount of curvature of the Petzval's image surface at the image height of which is 70% of the image plane, that is, an amount of curvature of the Petzval's image surface at 0.35D is expressed by $-P \cdot (0.35D)^2/2$. When the value of $-P \cdot (0.35D)^2/2$ exceeds 0.06D, the curvature of the sagittal image surface is increased too high. Therefore, it is impossible to provide a sufficiently high image formation performance. In other words, even if the picture-taking image plane is greatly curved, a difference of the amount of curvature on the picture-taking image plane between the longitudinal direction of the image plane and the direction perpendicular to it is increased. Accordingly, when the minimum F-number is assumed to be not more than F8 in the practical use, it is impossible to adapt the curvature of the sagittal image surface to that of the picture-taking image plane.

On the other hand, when the value of $-P \cdot (0.35D)^2/2$ becomes smaller than 0.025D, it is difficult to reduce the value of L/D sufficiently to be small. The above conditions are arranged to the conditional expression (1). In this connection, in a camera in which the size of the picture-taking image plane can be changed over, it is necessary that the conditional expression (1) is satisfied by the highest value of D.

In the case where a high image quality is required or a lower value of L/D is required, the upper and lower limits may be found by the conditional expression (1') or (1'').

Conditional expression (2) stipulates a ratio of the curvature of the picture-taking image plane in the longitudinal direction to the curvature of the Petzval's image surface so that the curvature of the picture-taking image plane can be appropriately determined. When the curvature of the picture-taking image plane is increased exceeding the upper limit, a difference of the amount of curvature of the picture-taking image plane between the directions is increased in the same manner as described above. Therefore, it is difficult to provide a high image formation performance on the entire picture-taking image plane. On the contrary even if it is attempted that the curvatures of the sagittal and meridional image surfaces are adapted to the curvature of the picture-taking image plane under the condition that the curvature of the picture-taking image plane is reduced exceeding the lower limit, astigmatism is corrected exceedingly, and the sagittal image surface becomes distant from the meridional image surface.

In the case where a high image quality is required, the upper and lower limits may be found from the conditional expression (2') or (2").

Conditional expression (3) stipulates a focal length of the first lens. When the focal length of the first lens is increased exceeding the upper limit stipulated by the conditional expression (3), the telephoto ratio is increased. Therefore, it becomes difficult to reduce a value of D/L. When the focal length of the first lens is decreased exceeding the lower limit stipulated by the conditional expression (3), positive distortion is increased, and also spherical aberration is increased. Therefore, the correction can not be sufficiently carried out.

In the case where only the first or third lens is made of glass, a distribution of refracting power to the lens is increased, and it is preferable that the conditional expressions (3") and (3"') are adopted. When the focal length exceeds the lower limit, the focus position is greatly changed in accordance with a change in temperature, which is not preferable. In the case where all lenses are made of glass, it is possible to reduce the telephoto ratio by increasing a distribution of refracting power to the first lens. Accordingly, it is preferable to adopt the conditional expression (3').

Conditional expression (4) stipulates an interval on the axis between the second and third lenses. When the interval exceeds the upper limit of the conditional expression (4), the telephoto ratio is increased. Therefore, it is difficult to reduce D/L. When the interval exceeds the lower limit of the conditional expression (4), an introversive coma is generated, so that the correction becomes difficult.

Conditional expression (5) appropriately stipulates a radius of curvature of the first surface of the first lens. When the radius of curvature of this surface is increased exceeding the upper limit of the conditional expression (5), the telephoto ratio is increased. Further, there is a tendency that the maridional image surface is put into a condition of "over" in the periphery. When the radius of curvature of this surface is decreased exceeding the lower limit of the conditional expression (5), spherical aberration tends to increase.

Conditional expression (6) stipulates an open F-number. When the minimum F-number exceeds the upper limit of the conditional expression (6), an amount of light is insufficient in the indoor photography even if a flash bulb is lit. When the minimum F-number exceeds the lower limit of the conditional expression (6), the focal depth is reduced. Therefore, in order to make up for a difference of the amount of curvature on the picture-taking image plane, it is necessary to reduce the curvature. As a result, it becomes difficult to reduce a value of L/D.

In the system described on page 11 of the December issue of 1994 of "Photographic Industry" in which films of 24 mm width are used, the largest image plane size is D=34.5 mm.

When a range of $-\Delta$ is found from the value using the conditional expressions (1) and (2), the following inequality is provided.

$$0.13 \leq -\Delta \leq 2.49$$

However, it is preferable to determine the range in accordance with the conditional expression (7). Even if it is attempted to sufficiently reduce the value of L/D exceeding the lower limit, the sagittal image surface and the maridional image surface become far distant from each other, which is not preferable.

When an especially high image forming performance is required, it is preferable that the following inequality is satisfied.

$$0.40 \leq -\Delta \leq 1.00$$

Conditional expression (8) stipulates a preferable focal length of the fixed focus camera in which a roll film of 24 mm width is used.

In the case of a triplet type lens, from the viewpoint of correcting aberration, it is preferable to maintain a field angle to be not more than 80°. When the image plane size is D =34.5 mm, this condition is expressed by the following inequality.

$$D/2 \leq f \cdot \tan(80°/2)$$

In this way, the lower limit can be provided.

In a fixed focus camera, when the focus is adjusted at hyperfocal distance $U_0$ using the maximum F-number, that is, using the minimum diaphragm $F_{max}$, the depth of field is extended from the closest picture-taking distance $U_0/2$ to the infinite at the maximum F-number. This relation is expressed by the following expression.

$$f^2/(F_{max} \cdot \epsilon) = U_0$$

where $\epsilon$ is the diameter of a permissible circle of confusion.

In the fixed focus camera in which a roll film of 24 mm width is used, the practical value of $\epsilon$ is considered to be 0.05 mm. When the closest picture-taking distance $U_0/2$ is not more than 900 mm, and this value is substituted in the above expression, the upper limit of the conditional expression can be provided. When the value exceeds this upper limit, the closest picture-taking distance is extended, which is not preferable.

In the case where the first lens of the triplet type lens is made of glass and the second and third lenses are made of synthetic resin, exceeding the upper limit of the conditional expression (9), the index of refraction of the first lens is increased. In this case, the cost of glass is increased. Exceeding the lower limit, the index of refraction of the first lens is decreased. In this case, the Petzval's Sum is extremely increased.

BRIEF DESCRIPTION OF THE DRAWINGS

FIGS. 19A, 17B, and 19C are aberration diagrams of the example 9 of the triplet type lens assembled to the camera of the present invention.

DETAILED DESCRIPTION OF THE INVENTION

Figure 1:
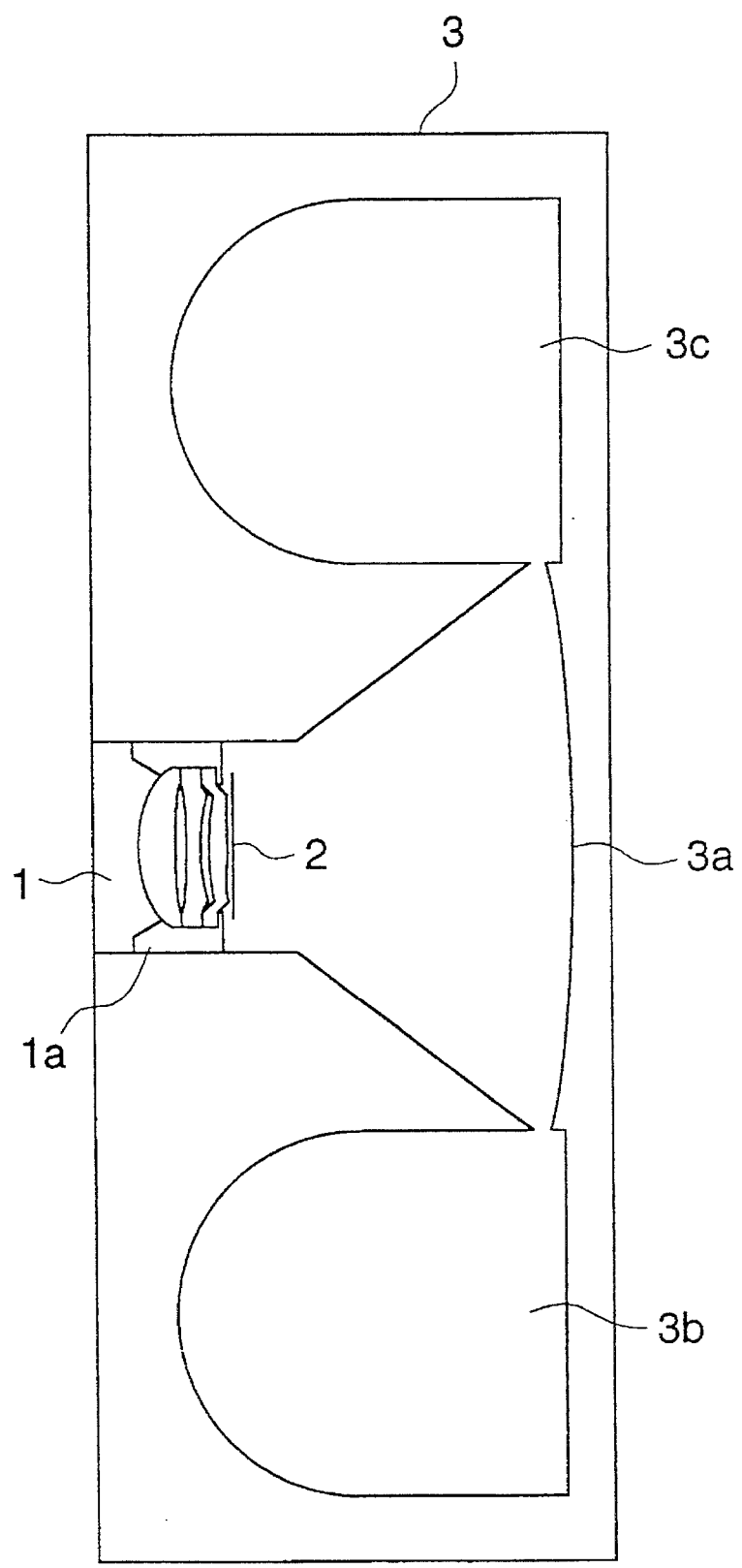
FIG. 1 is a schematic illustration showing a composition of the camera of the present invention.

An embodiment of the camera of the present invention is described below. FIG. 1 is a schematic overall arrangement view.

In FIG. 1, numeral 1 is a triplet type lens having a diaphragm 2 arranged at the rear of the lens. The triplet type lens 1 is arranged in a lens barrel 1a, which is assembled to a camera body 3.

In a camera body 3 in which a roll film of 35 mm or 24 mm width is used, there are provided a film magazine cheer 3b and a reel chamber 3c. Between the film magazine chamber 3b and the reel chamber 3c, there is provided a picture-taking image plane 3a, the longitudinal direction of which is curved onto the photographic object side. On the picture-taking image plane, a photographic film is set.

An example of the triplet type lens assembled to this camera of the present invention is described below. In the example described below, the picture-taking image plane is composed of a portion of a cylindrical surface, and the longitudinal direction of the picture-taking image plane is curved onto the photographic object side. In each example, the radius R of curvature is appropriately determined so that the sagittal and maridional image surfaces can approach the picture-taking image plane in a well-balanced condition.

Examples 1 to 4 correspond to a camera in which a roll film of 24 mm width is used. In the example 1, the second and third lenses are made of synthetic resin. In the examples 2 and 3, the first lens I and second lens II are made of synthetic resin. In these examples, the cost of the picture-taking lens is reduced by using two lenses made of synthetic resin. In the example 4, all lenses are made of glass so as to accomplish high performance. In the examples 5 to 11, lenses used for a roll film of 35 mm width are shown. In the examples 5 to 7, lenses are made of glass. In the examples 8 and 9, the second lens II and third lens III are made of synthetic resin. In the examples 10 and 11, the first lens I and second lens II are made of synthetic resin.

In this connection, an aspherical surface is shown by the mark *. The configuration of the aspherical surface is expressed by the following expression, wherein X-axis is set in the optical axis direction, and Y-axis is set in the direction perpendicular to the optical axis direction.

Expression 2

$$X = \frac{Y^2/r}{1 + \sqrt{1 - (1+\kappa)Y^2/r^2}} + \sum_{i=2}^{\infty} A_{2i} Y^{2i}$$

where r is a paraxial radius of curvature, and $\kappa$ and $A_{2i}$ are aspherical coefficients.

Example 1 of the triplet type lens
f=24.0, F=5.7, and 2ω=74.2°

| Face No. | r | d | nd | vd |
|---|---|---|---|---|
| Ia | 7.921 | 2.40 | 1.69680 | 55.5 |
| Ib | 19.817 | 0.80 | | |
| IIa | −29.123 | 0.90 | 1.58300 | 30.0 |
| IIb | 8.646 | 0.75 | | |
| IIIa | 13.780 | 1.45 | 1.49200 | 57.0 |
| IIIb | −14.993 | 0.35 | | |

Diaphragm ∞

Diagonal length of the image plane D=34.5

Radius R of curvature in the longitudinal direction of the picture-taking image plane R=−80

L/D=0.74

Figure 2:
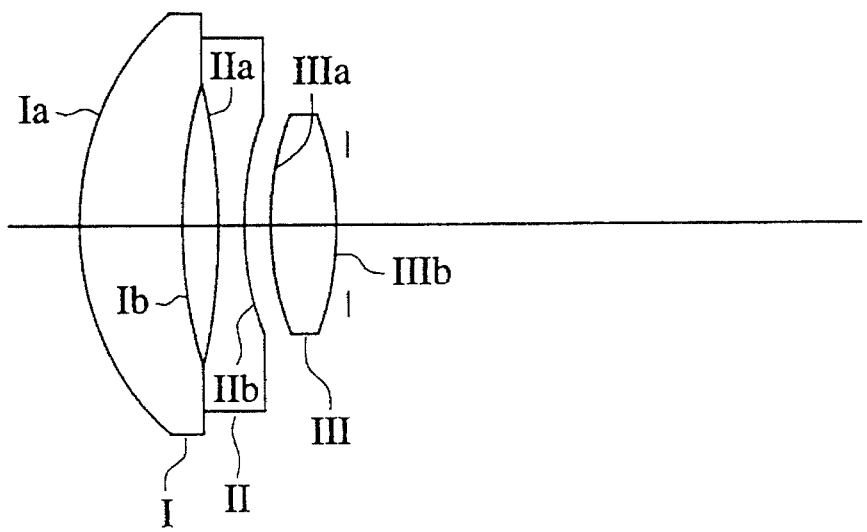
FIG. 2 is a sectional view of the example 1 of the triplet type lens assembled to the camera of the present invention.
Figure 3A:
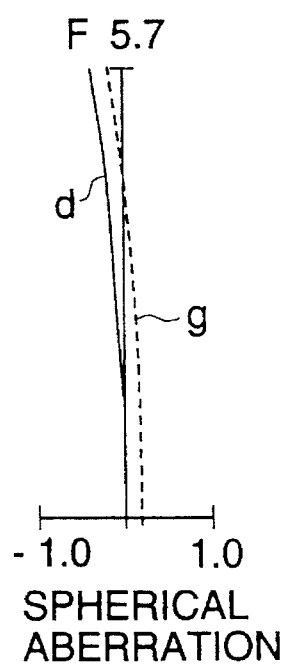
FIGS. 3A, 3B, and 3C are abberation diagrams of the example 1 of the triplet type lens assembled to the camera of the present invention.
Figure 3B:
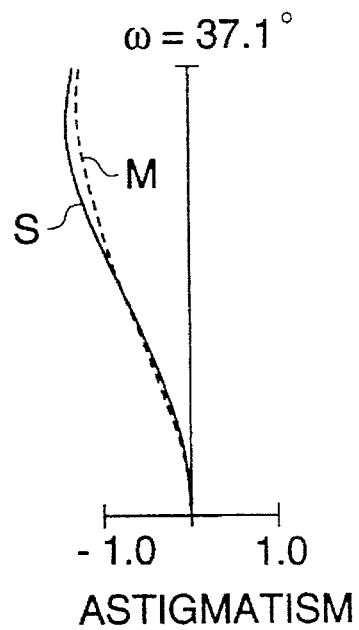
Figure 3C:
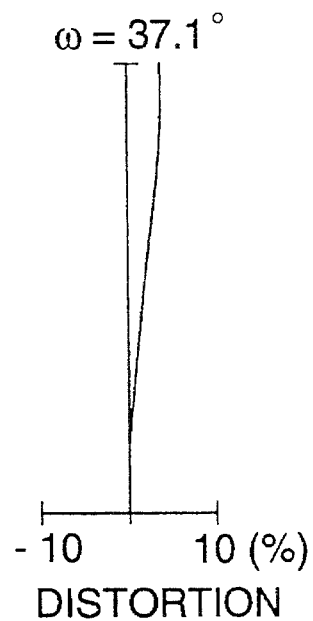

The sectional view and aberration diagram of the triplet type lens are respectively shown in FIGS. 2 and 3.

Example 2 of the triplet type lens
f=24.0, F=6.7, and 2ω=73.6°

| Face No. | r | d | nd | vd |
|---|---|---|---|---|
| Ia | 6.964 | 2.80 | 1.49200 | 57.0 |
| Ib | 21.182 | 0.55 | | |
| IIa | −29.564 | 0.90 | 1.58300 | 30.0 |
| IIb | 12.323 | 0.90 | | |
| IIIa | 29.134 | 1.10 | 1.74320 | 49.3 |
| IIIb | −23.750 | 0.10 | | |

Diaphragm ∞

Diagonal length of the image plane D=34.5

Radius R of curvature in the longitudinal direction of the picture-taking image plane R=−100

L/D=0.74

Figure 4:
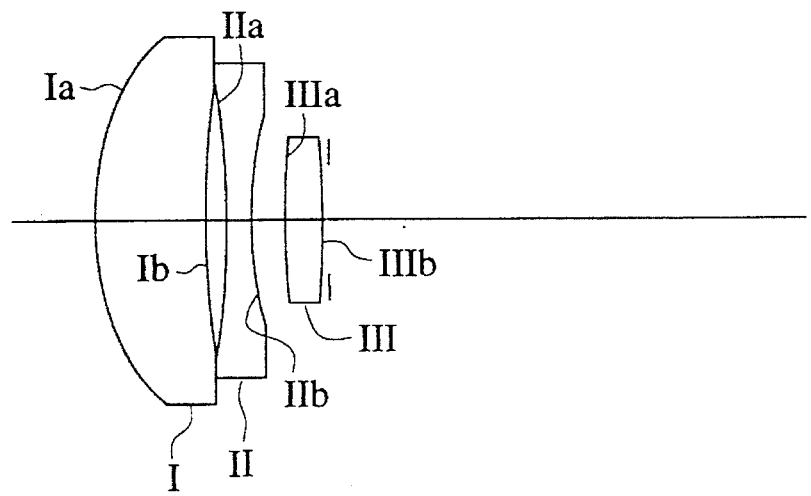
FIG. 4 is a sectional view of the example 2 of the triplet type lens assembled to the camera of the present invention.
Figure 5A:
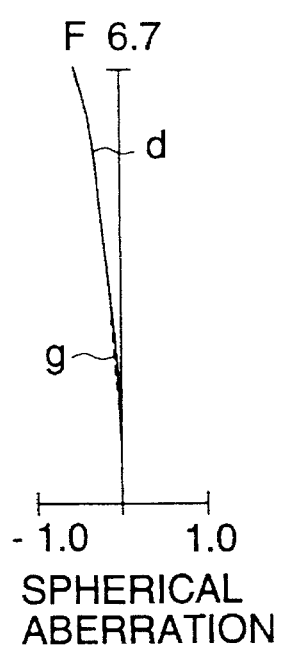
FIGS. 5A, 5B and 5C are aberration diagrams of the example 2 of the triplet type lens assembled to the camera of the present invention.
Figure 5B:
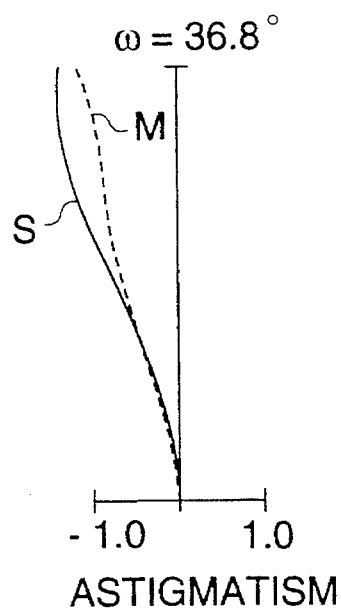
Figure 5C:
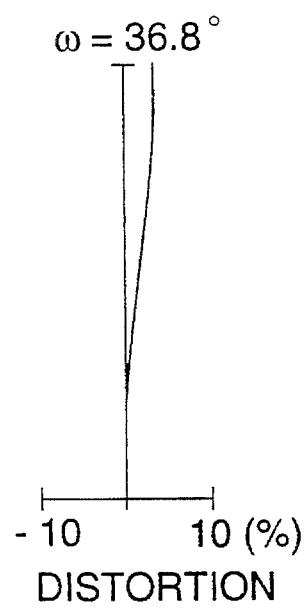

The sectional view and aberration diagram of the triplet type lens are respectively shown in FIGS. 4 and 5.

Example 3 of the triplet type lens f=27.5, F=5.7, and 2ω=65.6°

| Face No. | r | d | nd | vd |
|---|---|---|---|---|
| Ia | 6.978 | 2.40 | 1.49200 | 57.0 |
| Ib | 21.421 | 0.55 | | |
| *IIa | −38.310 | 0.90 | 1.58300 | 30.0 |
| IIb | 9.842 | 0.72 | | |
| IIIa | 30.541 | 1.20 | 1.74320 | 49.3 |
| IIIb | −22.091 | 0.10 | | |

Diaphragm ∞

Aspherical face coefficient

Third face IIa

K=72.568

A4=0.97560×10$^{-4}$

A6=0.13464×10$^{-4}$

Diagonal length of the image plane D=34.5

Radius R of curvature in the longitudinal direction of the picture-taking image plane R=−100

L/D=0.84

Figure 6:
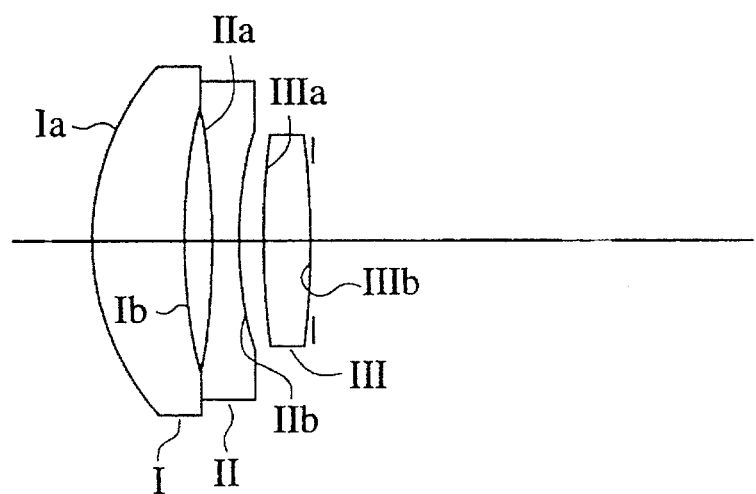
FIG. 6 is a sectional view of the example 3 of the triplet type lens assembled to the camera of the present invention.
Figure 7A:
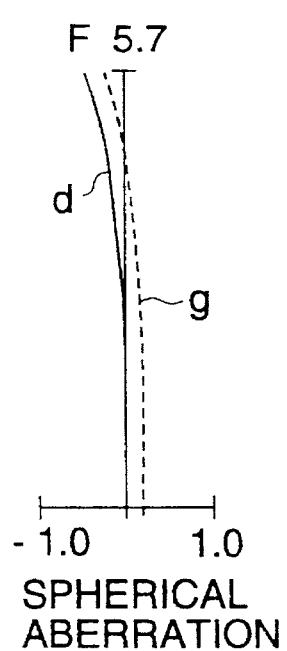
FIGS. 7A, 7B, and 7C are aberration diagrams of the example 3 of the triplet type lens assembled to the camera of the present invention.
Figure 7B:
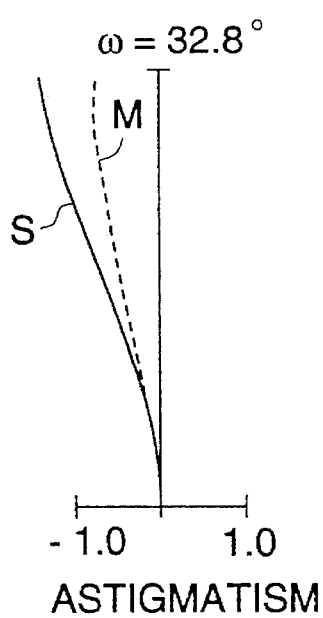
Figure 7C:
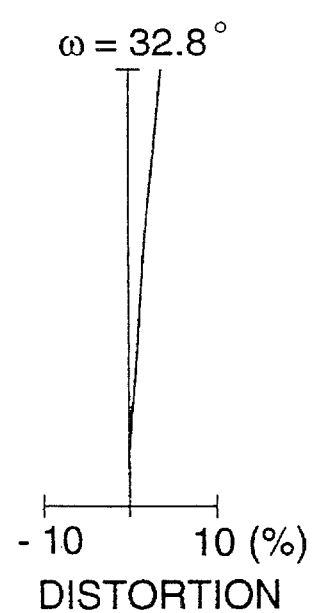

The sectional view and aberration diagram of the triplet type lens are respectively shown in FIGS. 6 and 7.

Example 4 of the triplet type lens f=22.5, F=5.7, and 2ω=75.8°

| Face No. | r | d | nd | vd |
|---|---|---|---|---|
| Ia | 7.638 | 2.40 | 1.78590 | 44.2 |
| Ib | 22.700 | 0.60 | | |
| IIa | −56.050 | 0.70 | 1.80518 | 25.4 |
| IIb | 10.172 | 1.25 | | |
| IIIa | 41.212 | 1.10 | 1.80440 | 39.6 |
| IIIb | −20.796 | 0.40 | | |

Diaphragm ∞

Diagonal length of the image plane D=34.5

Radius R of curvature in the longitudinal direction of the picture-taking image plane R=−170

L/D=0.69

Figure 8:
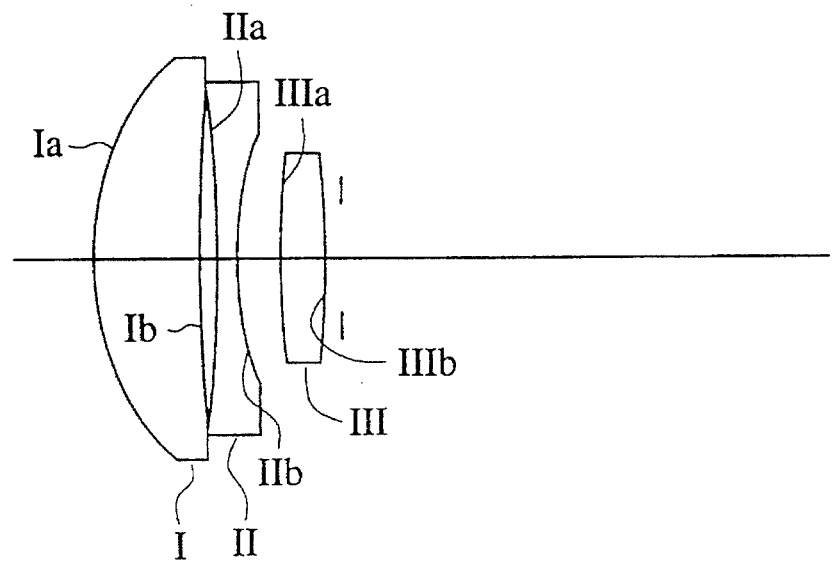
FIG. 8 is a sectional view of the example 4 of the triplet type lens assembled to the camera of the present invention.
Figure 9A:
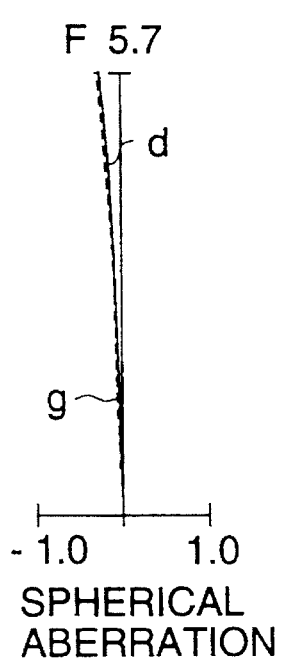
FIGS. 9A, 9B, and 9C are aberration diagrams of the example 4 of the triplet type lens assembled to the camera of the present invention.
Figure 9B:
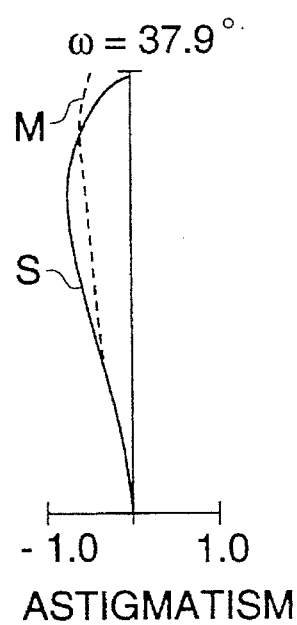
Figure 9C:
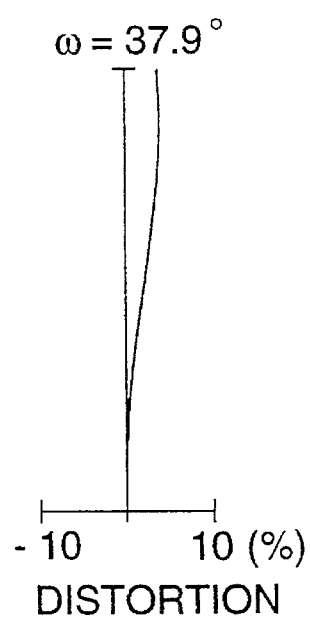

The sectional view and aberration diagram of the triplet type lens are respectively shown in FIGS. 8 and 9.

Example 5 of the triplet type lens f=29.30, F=5.7, and 2ω=74.2°

| Face No. | r | d | nd | vd |
|---|---|---|---|---|
| Ia | 8.611 | 2.50 | 1.69680 | 55.5 |
| Ib | 23.290 | 0.60 | | |
| IIa | −30.352 | 0.70 | 1.67270 | 32.1 |
| IIb | 10.872 | 0.85 | | |
| IIIa | 41.592 | 1.20 | 1.74400 | 44.7 |
| IIIb | −18.128 | 0.35 | | |

Diaphragm ∞

Diagonal length of the image plane D=43.2

Radius R of curvature in the longitudinal direction of the picture-taking image plane R=−130

L/D=0.71

Figure 10:
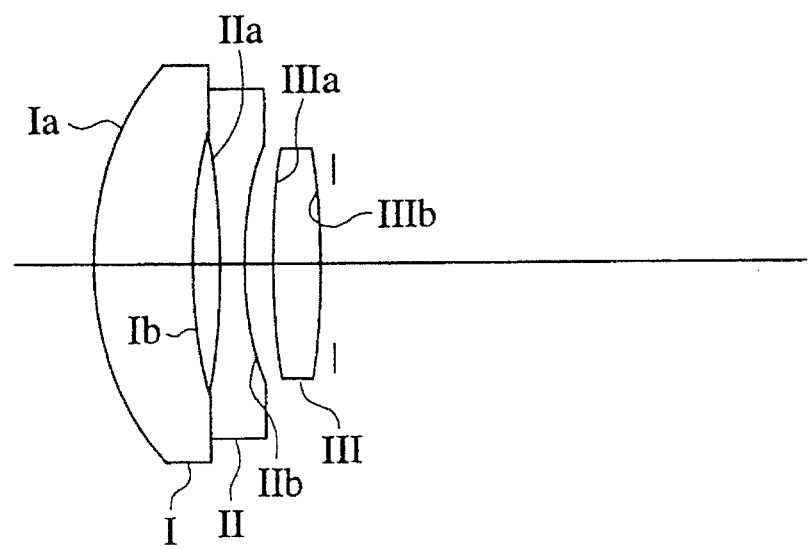
FIG. 10 is a sectional view of the example 5 of the triplet type lens assembled to the camera of the present invention.
Figure 11A:
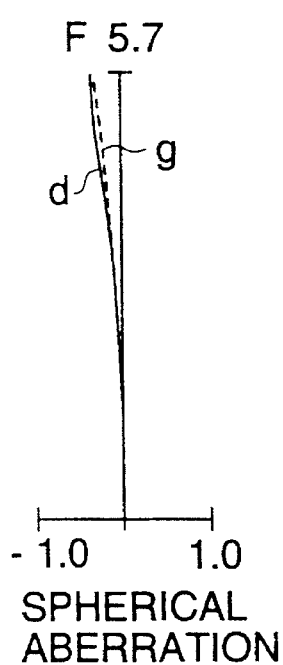
FIGS. 11A, 11B, and 11C are aberration diagrams of the example 5 of the triplet type lens assembled to the camera of the present invention.
Figure 11B:
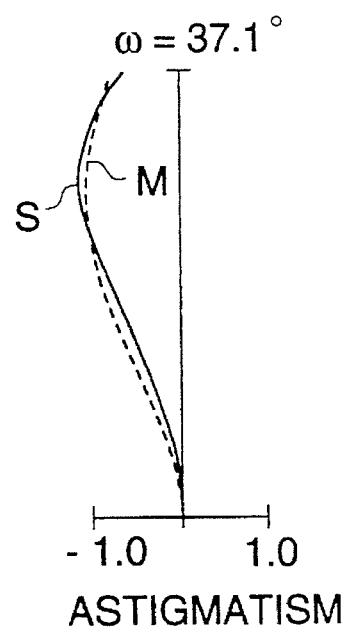
Figure 11C:
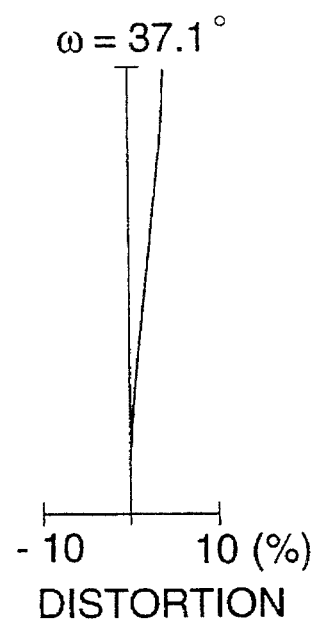

The sectional view and aberration diagram of the triplet type lens are respectively shown in FIGS. 10 and 11.

Example 6 of the triplet type lens f=29.29, F=5.7, and 2ω=74.2°

| Face No. | r | d | nd | vd |
|---|---|---|---|---|
| Ia | 8.508 | 1.90 | 1.74400 | 44.7 |
| Ib | 27.754 | 0.60 | | |
| IIa | −34.272 | 0.70 | 1.78470 | 26.2 |
| IIb | 11.460 | 0.85 | | |
| IIIa | 11.361 | 1.10 | 1.83400 | 37.2 |
| IIIb | −16.965 | 0.35 | | |

Diaphragm ∞

Diagonal length of the image plane D=43.2

Radius R of curvature in the longitudinal direction of the picture-taking image plane R=−110

L/D=0.71

Figure 12:
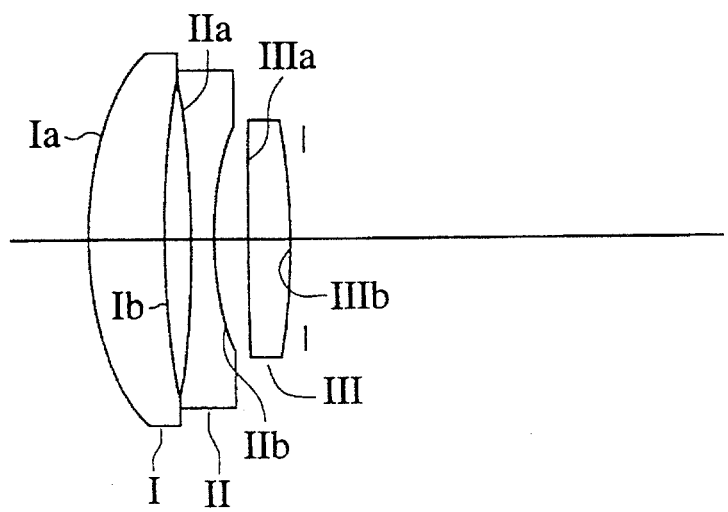
FIG. 12 is a sectional view of the example 6 of the triplet type lens assembled to the camera of the present invention.
Figure 13A:
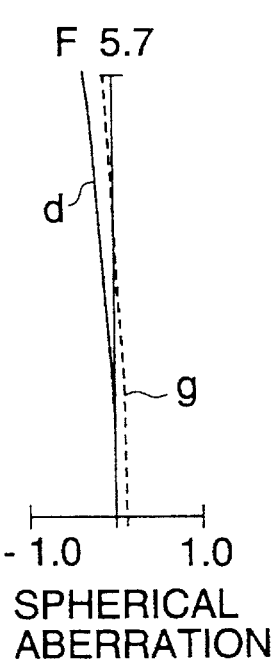
FIGS. 13A, 13B, and 13C are aberration diagrams of the example 6 of the triplet type lens assembled to the camera of the present invention.
Figure 13B:
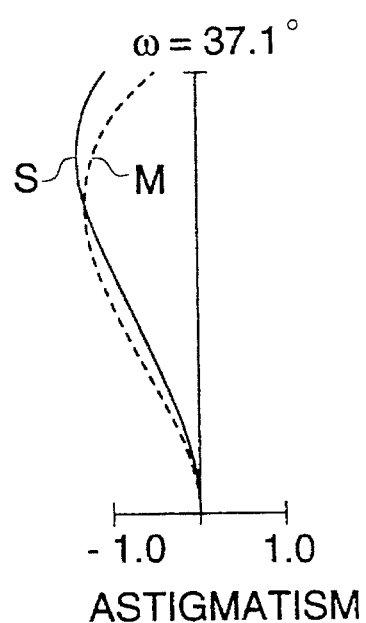
Figure 13C:
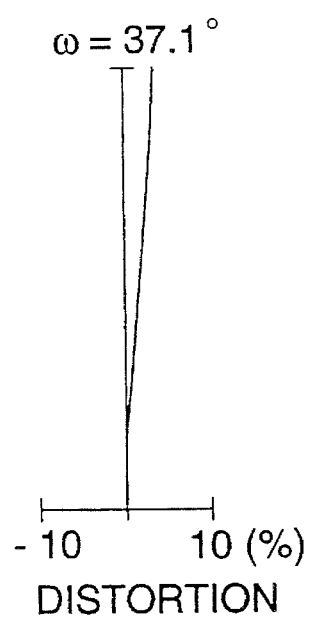

The sectional view and aberration diagram of the triplet type lens are respectively shown in FIGS. 12 and 13.

Example 7 of the triplet type lens f=27.48, F=6.7, and 2ω=75.6°

| Face No. | r | d | nd | vd |
|---|---|---|---|---|
| Ia | 7.949 | 2.40 | 1.78590 | 44.2 |
| Ib | 22.063 | 0.60 | | |
| IIa | −60.585 | 0.70 | 1.80518 | 25.4 |
| IIb | 9.525 | 1.10 | | |
| IIIa | 45.111 | 1.10 | 1.83400 | 37.2 |
| IIIb | −21.018 | 0.35 | | |

Diaphragm ∞

Diagonal length of the image plane D=43.2

Radius R of curvature in the longitudinal direction of the picture-taking image plane R=−350

L/D=0.65

Figure 14:
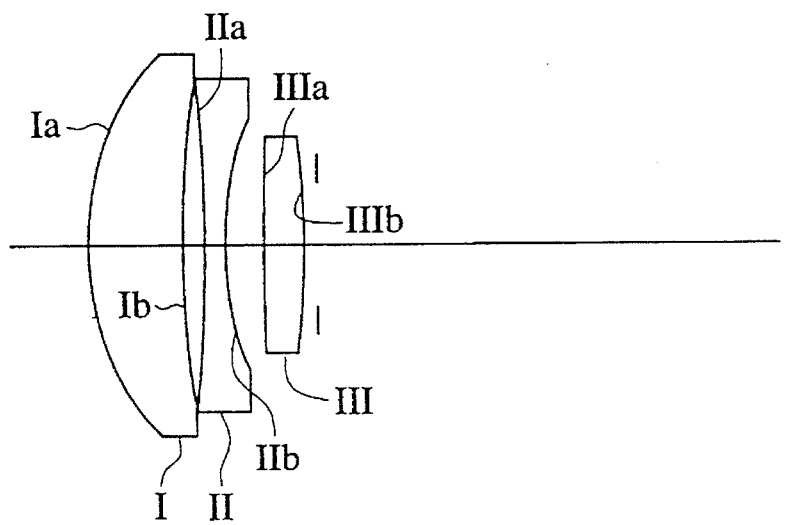
FIG. 14 is a sectional view of the example 7 of the triplet type lens assembled to the camera of the present invention.
Figure 15A:
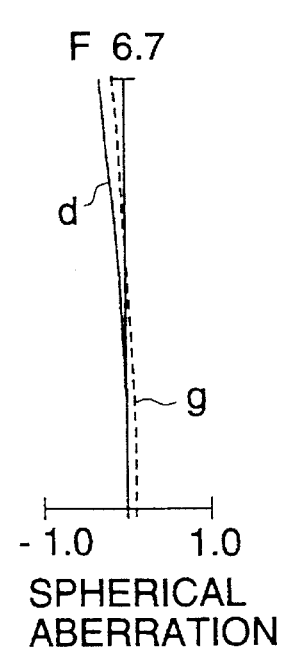
FIGS. 15A, 15B, and 15C are aberration diagrams of the example 7 of the triplet type lens assembled to the camera of the present invention.
Figure 15B:
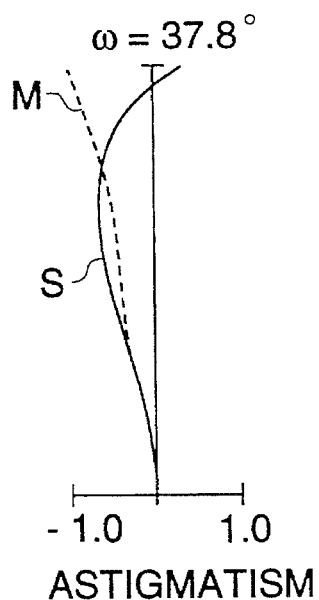
Figure 15C:
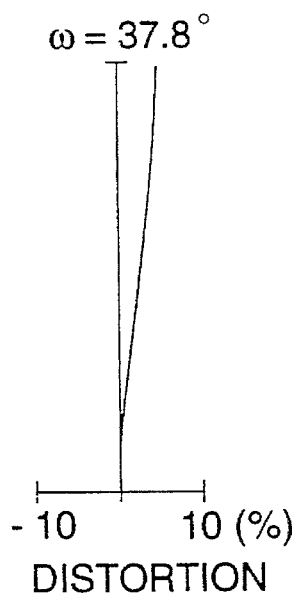

The sectional view and aberration diagram of the triplet type lens are respectively shown in FIGS. 14 and 15.

Example 8 of the triplet type lens f=29.31, F=5.8, and 2ω=72.2°

| Face No. | r | d | nd | vd |
|---|---|---|---|---|
| Ia | 7.964 | 2.80 | 1.61484 | 51.2 |
| Ib | 24.163 | 0.65 | | |
| IIa | −44.020 | 1.00 | 1.58300 | 30.0 |
| *IIb | 8.520 | 0.58 | | |

-continued

| Face No. | r | d | nd | vd |
|---|---|---|---|---|
| IIIa | 16.373 | 1.60 | 1.49200 | 57.0 |
| IIIb | −19.000 | 0.10 | | |

Diaphragm ∞
Aspherical face coefficient
Fourth face IIb
K=−0.2722
A4=0.7632×10⁻⁴
A6=0.1617×10⁻⁵

Diagonal length of the image plane D=43.2

Radius R of curvature in the longitudinal direction of the picture-taking image plane R=−140

L/D=0.69

Figure 16:
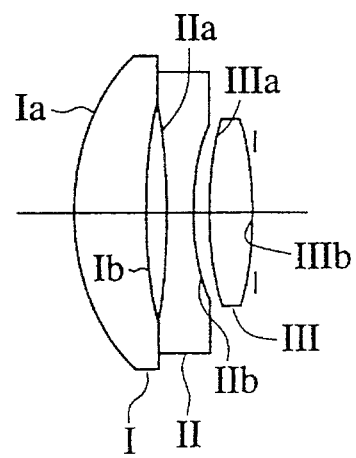
FIG. 16 is a sectional view of the example 8 of the triplet type lens assembled to the camera of the present invention.
Figure 17A:
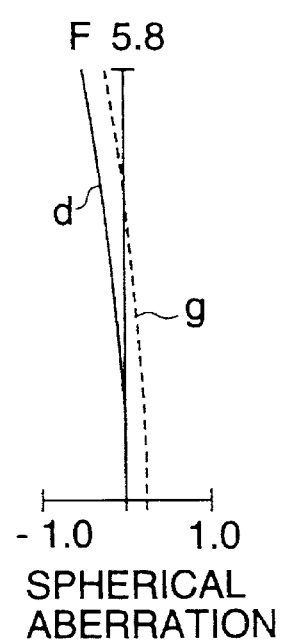
FIGS. 17A, 17B, and 17C are aberration diagrams of the example 8 of the triplet type lens assembled to the camera of the present invention.
Figure 17B:
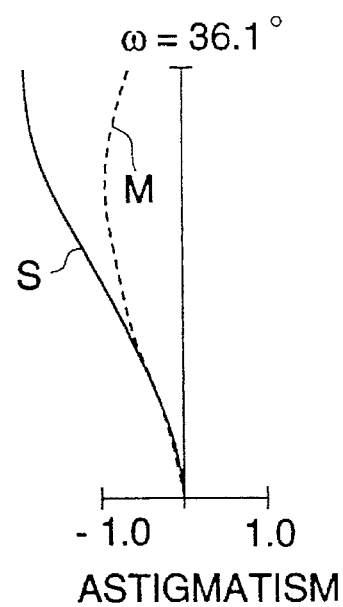
Figure 17C:
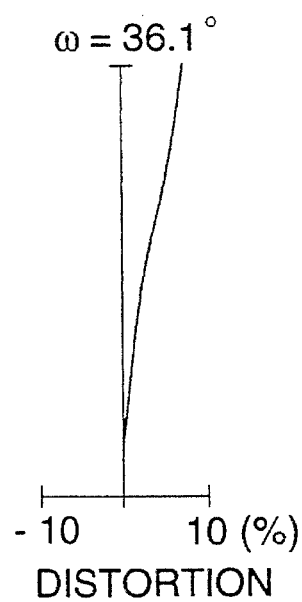

The sectional view and aberration diagram of the triplet type lens are respectively shown in FIGS. 16 and 17.

Example 9 of the triplet type lens f=27.50, F=6.7, and 2ω=76.0°

| Face No. | r | d | nd | vd |
|---|---|---|---|---|
| Ia | 7.740 | 2.45 | 1.62280 | 57.0 |
| Ib | 19.695 | 0.75 | | |
| IIa | −37.567 | 0.90 | 1.58300 | 30.0 |
| *IIb | 9.676 | 0.72 | | |
| IIIa | 17.060 | 1.32 | 1.49200 | 57.0 |
| IIIb | −18.006 | 0.35 | | |

Diaphragm ∞
Diagonal length of the image plane D=43.2

Radius R of curvature in the longitudinal direction of the picture-taking image plane R=−150

L/D=0.66

Figure 18:
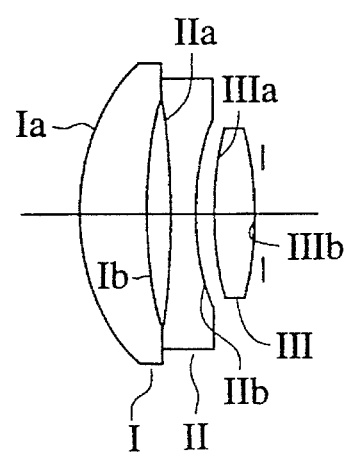
FIG. 18 is a sectional view of the example 9 of the triplet type lens assembled to the camera of the present invention.
Figures 19A, 19B, 19C:
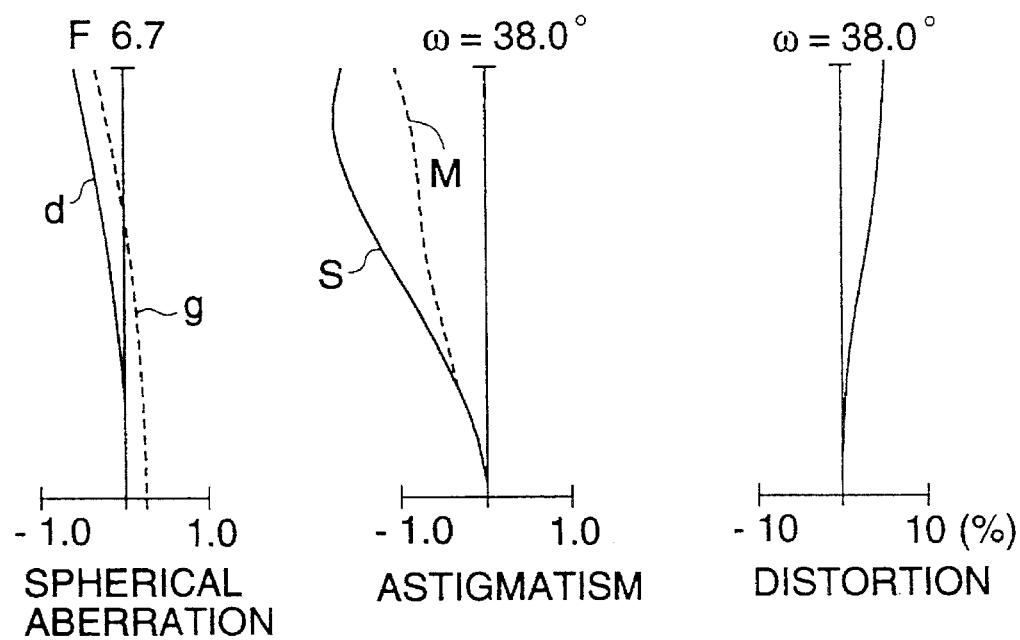

The sectional view and aberration diagram of the triplet type lens are respectively shown in FIGS. 18 and 19.

Example 10 of the triplet type lens f=29.24, F=5.8, and 2ω=71.0°

| Face No. | r | d | nd | vd |
|---|---|---|---|---|
| Ia | 6.802 | 2.70 | 1.49200 | 57.0 |
| Ib | 15.399 | 0.75 | | |
| *IIa | −33.416 | 1.00 | 1.58300 | 30.0 |
| IIb | 7.732 | 0.30 | | |
| IIIa | 12.944 | 1.45 | 1.74400 | 44.7 |
| IIIb | −33.034 | 0.10 | | |

Diaphragm ∞
Aspherical face coefficient
Third face IIa
κ=7.266
A4=0.9081×10⁻⁵
A6=0.2487×10⁻⁵

Diagonal length of the image plane D=43.2

Radius R of curvature in the longitudinal direction of the picture-taking image plane R=−400

L/D=0.69

Figure 20:
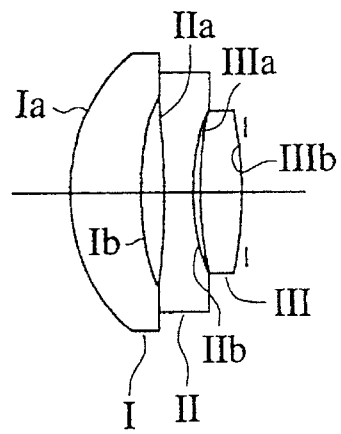
FIG. 20 is a sectional view of the example 10 of the triplet type lens assembled to the camera of the present invention.
Figure 21A:
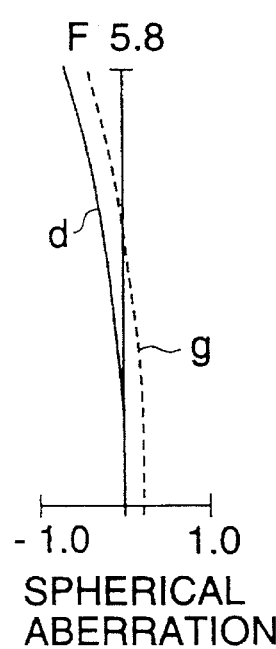
FIGS. 21A, 21B, and 21C are aberration diagrams of the example 10 of the triplet type lens assembled to the camera of the present invention.
Figure 21B:
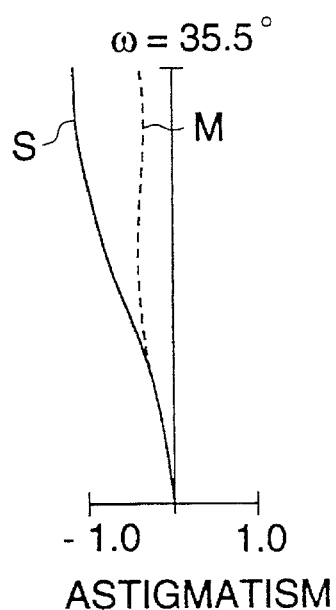
Figure 21C:
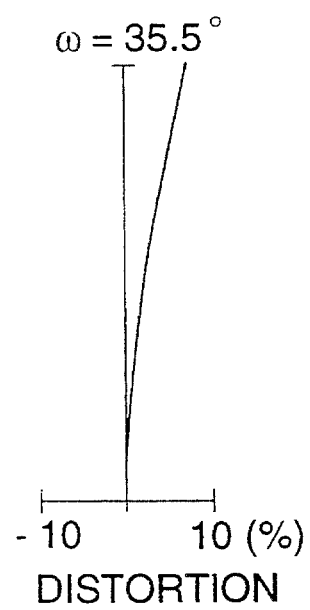

The sectional view and aberration diagram of the triplet type lens are respectively shown in FIGS. 20 and 21.

Example 11 of the triplet type lens f=27.29, F=6.7, and 2ω=77.0°

| Face No. | r | d | nd | vd |
|---|---|---|---|---|
| Ia | 7.362 | 2.91 | 1.49200 | 57.0 |
| Ib | 18.805 | 0.89 | | |
| IIa | −27.378 | 0.90 | 1.58300 | 30.0 |
| IIb | 12.272 | 0.59 | | |
| IIIa | 26.464 | 1.15 | 1.74320 | 49.3 |
| IIIb | −23.413 | 0.90 | | |

Diaphragm ∞

Diagonal length of the image plane D=43.2

Radius R of curvature in the longitudinal direction of the picture-taking image plane R=−200

L/D=0.66

Figure 22:
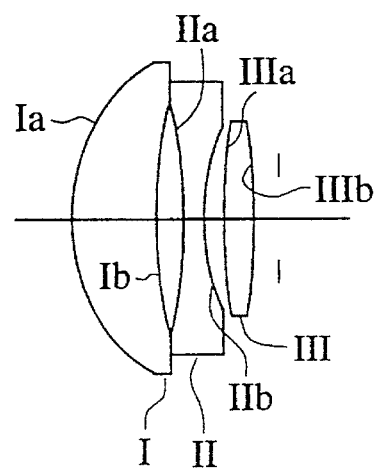
FIG. 22 is a sectional view of the example 11 of the triplet type lens assembled to the camera of the present invention.
Figure 23A:
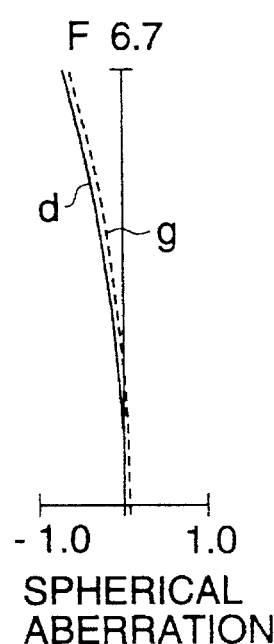
FIGS. 23A, 23B, and 23C are aberration diagrams of the example 11 of the triplet type lens assembled to the camera of the present invention.
Figure 23B:
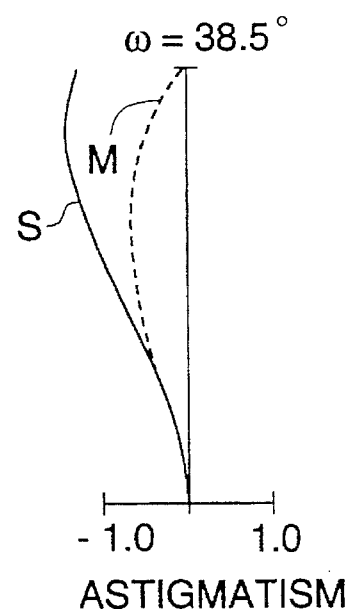
Figure 23C:
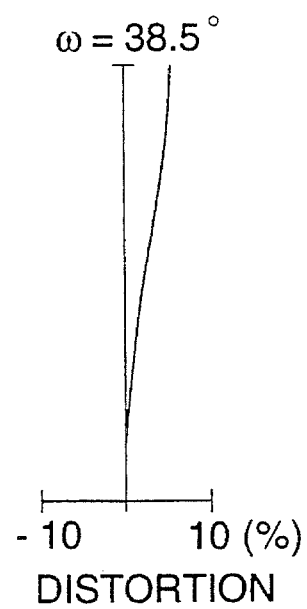

The sectional view and aberration diagram of the triplet type lens are respectively shown in FIGS. 22 and 23.

Values for the conditional expression of each example are shown in Table 1.

TABLE 1

| Example Lens Composition | 1 GPP | 2 PPG | 3 PPG | 4 GGG | 5 GGG | 6 GGG | 7 GGG | 8 GPP | 9 GPP | 10 PPG | 11 PPG |
|---|---|---|---|---|---|---|---|---|---|---|---|
| P · D | 0.75 | 0.76 | 0.62 | 0.65 | 0.59 | 0.62 | 0.56 | 0.78 | 0.86 | 0.62 | 0.78 |
| −Δ/{P · 0.35D)²/2} | 0.58 | 0.45 | 0.55 | 0.31 | 0.88 | 1.04 | 0.33 | 0.40 | 0.33 | 0.18 | 0.28 |
| $f_1/f$ | 0.73 | 0.82 | 0.73 | 0.61 | 0.63 | 0.54 | 0.54 | 0.62 | 0.69 | 0.77 | 0.83 |
| $d_4/f$ | 0.031 | 0.038 | 0.026 | 0.056 | 0.029 | 0.029 | 0.040 | 0.020 | 0.026 | 0.010 | 0.022 |
| $r_1/f$ | 0.33 | 0.29 | 0.25 | 0.34 | 0.29 | 0.29 | 0.29 | 0.27 | 0.28 | 0.23 | 0.27 |
| $n_1-n_3$ | 0.20 | −0.25 | −0.25 | −0.02 | −0.05 | −0.09 | −0.05 | 0.12 | 0.13 | −0.25 | −0.25 |

(In the lens composition, G represents a lens made of glass, and P represents a lens made of synthetic resin.)

According to the present invention, the following effects are provided. As can be seen from each example and its aberration diagram, it is possible to obtain a camera of high image formation performance in which a roll film of 24 mm width is used, and the camera is provided with a small inexpensive triplet type picture-taking lens in which a ratio of the overall lens length including the back focal length to the diagonal length of the image plane is low.

What is claimed is:

1. A camera with a triplet type lens for taking a photograph, comprising:

said triplet type lens including:
  a first lens having a positive refracting power;
  a second lens having a negative refracting power;
  a third lens having a positive refracting power;
  wherein said first lens, said second lens, and said third lens are arranged in that order on an optical axis from a photographic object side of said camera;

a diaphragm, located at the rear of the triplet type lens; and a means for providing a picture-taking image plane;

wherein a longitudinal direction of said picture-taking image plane is curved onto said photographic object side, and said triplet type lens satisfy:

$$0.41 \leq P.D \leq 0.98$$

where P is a Petzval's Sum of said triplet type lens and D is a length of a diagonal line of said picture-taking image plane.

2. The camera of claim 1, wherein said triplet type lens satisfy:

$$0.15 \leq -\Delta/(P.(0.35D)^2/2) \leq 1.2$$

where $\Delta$ is an amount of curvature of said picture-taking image plane at a position 0.35D distant from a center of said picture-taking image plane in said longitudinal direction of said picture-taking image plane.

3. The camera of claim 2, wherein said triplet type lens satisfy:

$$0.40 \leq f_1/f \leq 1.00$$

$$0.01 \leq d_4/f \leq 0.06$$

where f is a focal length of said triplet type lens, $f_1$ is a focal length of said first lens, and $d_4$ is an interval between said second lens and said third lens on said optical axis.

4. The camera of claim 2, wherein said triplet type lens satisfy:

$$0.21 \leq r_1/f \leq 0.38$$

where $r_1$ is a radius of curvature of a first surface of said first lens.

5. The camera of claim 2, wherein said triplet type lens satisfy:

$$4.0 \leq F \leq 8.0$$

where F is an minimum F-number.

6. The camera of claim 1, wherein a width of a photographic film used for said camera is 24 mm, and said triplet type lens of said camera satisfy:

$$0.20 \leq -\Delta \leq 1.20$$

7. The camera of claim 1, wherein a width of a photographic film used for said camera is 24 mm, said camera is of a fixed focus, and said triplet type lens satisfy:

$$21 \leq f \sqrt{(\pi \cdot F_{max.})}$$

where $F_{max.}$ is a maximum F-number used in said camera.

8. The camera of claim 1, wherein at least two lenses in said triplet type lens are made of a synthetic resin, and said triplet type lens satisfy:

$$0.15 \leq -\Delta/(P.(0.35D)^2/2) \leq 0.80$$

$$0.21 \leq r_1/f \leq 0.32$$

where $\Delta$ is an amount of curvature of said picture-taking image plane at a position 0.35D distant from a center of said picture-taking image plane in said longitudinal direction of said picture-taking image plane, f is a focal distance of said triplet type lens, and $r_1$ is a radius of curvature of a first surface of said first lens.

9. The camera of claim 8, wherein said first lens is made of glass and said second lens and said third lens are made of said synthetic resin, and said triplet type lens satisfy:

$$0.50 \leq f_1/f \leq 0.80$$

where $f_1$ is a focal length of said first lens.

10. The camera of claim 8, wherein said first lens is made of glass and said second lens and said third lens are made of said synthetic resin, and said triplet type lens satisfy:

$$0.00 \leq n_1 - n_3 \leq 0.21$$

where $n_1$ is an index of refraction of glass of said first lens, and $n_3$ is an index of refraction of glass of said third lens.

11. The camera of claim 8, wherein said first lens and said second lens are made of said synthetic resin and the third lens is made of glass, and said triplet type lens satisfy:

$$0.60 \leq f_1/f \leq 1.00$$

where $f_1$ is a focal length of said first lens.

12. The camera of claim 1, wherein all of said first lens, said second lens and said third lens are made of glass, and said triplet type lens satisfy:

$$0.50 \leq f_1/f \leq 0.70$$

where $f_1$ is a focal length of said first lens.

* * * * *